(12) United States Patent
Benco et al.

(10) Patent No.: US 7,299,054 B2
(45) Date of Patent: Nov. 20, 2007

(54) ALERTING FEATURE FOR RF AVAILABILITY OF MOBILE SUBSCRIBER

(75) Inventors: David S. Benco, Winfield, IL (US); Sanjeev Mahajan, Naperville, IL (US); Raymond L. Ruggerio, Glenview, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 62 days.

(21) Appl. No.: 11/116,878

(22) Filed: Apr. 28, 2005

(65) Prior Publication Data
US 2006/0246958 A1 Nov. 2, 2006

(51) Int. Cl.
*H04B 1/38* (2006.01)

(52) U.S. Cl. .................................................. 455/456

(58) Field of Classification Search .. 455/456.1–456.3, 455/422.1, 440–446, 421, 404.2, 67.1, 565, 455/3.01, 436, 438, 439, 63.1–63.4, 67.11, 455/423, 522, 12.1, 56, 418, 437, 427, 11.1, 455/432.1–432.3, 435.1–435.2, 414.1–414.2, 455/456

See application file for complete search history.

(56) References Cited

U.S. PATENT DOCUMENTS

| | | | |
|---|---|---|---|
| 6,597,906 B1 * | 7/2003 | Van Leeuwen et al. | 455/422.1 |
| 6,650,896 B1 * | 11/2003 | Haymes et al. | 455/423 |
| 6,721,572 B1 * | 4/2004 | Smith et al. | 455/456.1 |
| 6,751,443 B2 * | 6/2004 | Haymes et al. | 455/67.11 |
| 6,912,384 B2 * | 6/2005 | Huomo et al. | 455/417 |

* cited by examiner

*Primary Examiner*—Naghmeh Mehrpour

(57) ABSTRACT

An exemplary method in a wireless telecommunication system determines that a radio frequency (RF) communications link is not available to a wireless mobile. Information about a party originating a call to the wireless mobile is received and stored in a record associated with the wireless mobile. An alert flag associated with the wireless mobile is set. Upon determining that an RF link has become available to the wireless mobile and upon detecting the presence of the set alert flag, a communication action is automatically taken by which the party is made aware that an RF link is available to the wireless mobile, such as by sending a message to the party based on information stored about the party in the record.

5 Claims, 2 Drawing Sheets

ALERTING FEATURE FOR RF AVAILABILITY OF MOBILE SUBSCRIBER

BACKGROUND

This invention is generally directed to telecommunications and is more specifically directed to features related to wireless subscribers and their availability.

Modern telecommunication systems provide a variety of features for subscribers. For example, wireline telephone subscribers may utilize incoming caller identification, voicemail, speed dialing, conferencing and call waiting to name a few of the available services and features. Some telephone companies also offer wireline subscribers a service in which a call will automatically be established between the calling party and a called party that had a busy line during an initial call origination when the called party's line becomes not busy. In general, wireline telephone subscribers have available many call services and features that are not available to wireless subscribers. This is due in part to the substantial history and development of wireline switching capabilities as compared to the relatively short history of wireless communication systems. It is also partially due to inherent differences between wireline and wireless systems, i.e. a wireline subscriber's line is always supported by the same telecommunication switch and is normally always connected as compared to a wireless subscriber that may be served by a variety of telecommunication switches at different times and may not be connected or available for significant periods of time.

Calls placed to a wireless subscriber have a substantially greater likelihood of not being completed as compared to calls placed to a wireline subscriber. As used herein "being completed" refers to the ability of the telecommunication system to establish a communication link to the called party's consumer premises equipment (wireless handset or wireline telephone) in response to a call origination request. A call origination to a wireless subscriber may not be completed due to a variety of factors. For example, the wireless subscriber's handset may be turned OFF or a radio frequency (RF) link between a supporting base station and the subscriber's handset may not be available. Even while in areas of generally good RF signal strength, a wireless subscriber may enter a localized area in which RF communications are poor or not available. Commonly known "RF dead zones" include tunnels, underground parking garages, areas within buildings surrounded by material that provides RF shielding or substantial attenuation, etc.

What happens when a party originates a call to a wireless subscriber that does not complete? The calling party will be typically given no indication of the reason for the lack of completion. Even for those wireless systems which provide an announcement indicating that the called wireless subscriber cannot be reached or located, the calling party is left to wonder whether the wireless subscriber is not active (e.g. cellular telephone turned OFF) or whether the wireless subscriber is merely experiencing temporary RF link unavailability, e.g. being in an RF dead zone. Other than an option of leaving traditional voicemail for the unavailable wireless subscriber, the calling party is left to periodically initiate new call originations to the desired wireless subscriber in an attempt to establish communications. Thus, there exists a need for improved services related to calls desired to be established with wireless subscribers.

SUMMARY

It is an object of the invention to provide a solution to this need.

An exemplary method in a wireless telecommunication system determines that a radio frequency (RF) communications link is not available to a wireless mobile. Information about a party originating a call to the wireless mobile is received and stored in a record associated with the wireless mobile. An alert flag associated with the wireless mobile is set. Upon determining that an RF link has become available to the wireless mobile and upon detecting the presence of the set alert flag, a communication action is automatically taken by which the party is made aware that an RF link is available to the wireless mobile, such as by sending a message to the party based on information stored about the party in the record.

The invention in one implementation encompasses an apparatus such as a mobile switching center that is instrumental in implementing the method.

DESCRIPTION OF THE DRAWINGS

Features of exemplary implementations of the invention will become apparent from the description, the claims, and the accompanying drawings in which:

DETAILED DESCRIPTION

Figure 1:
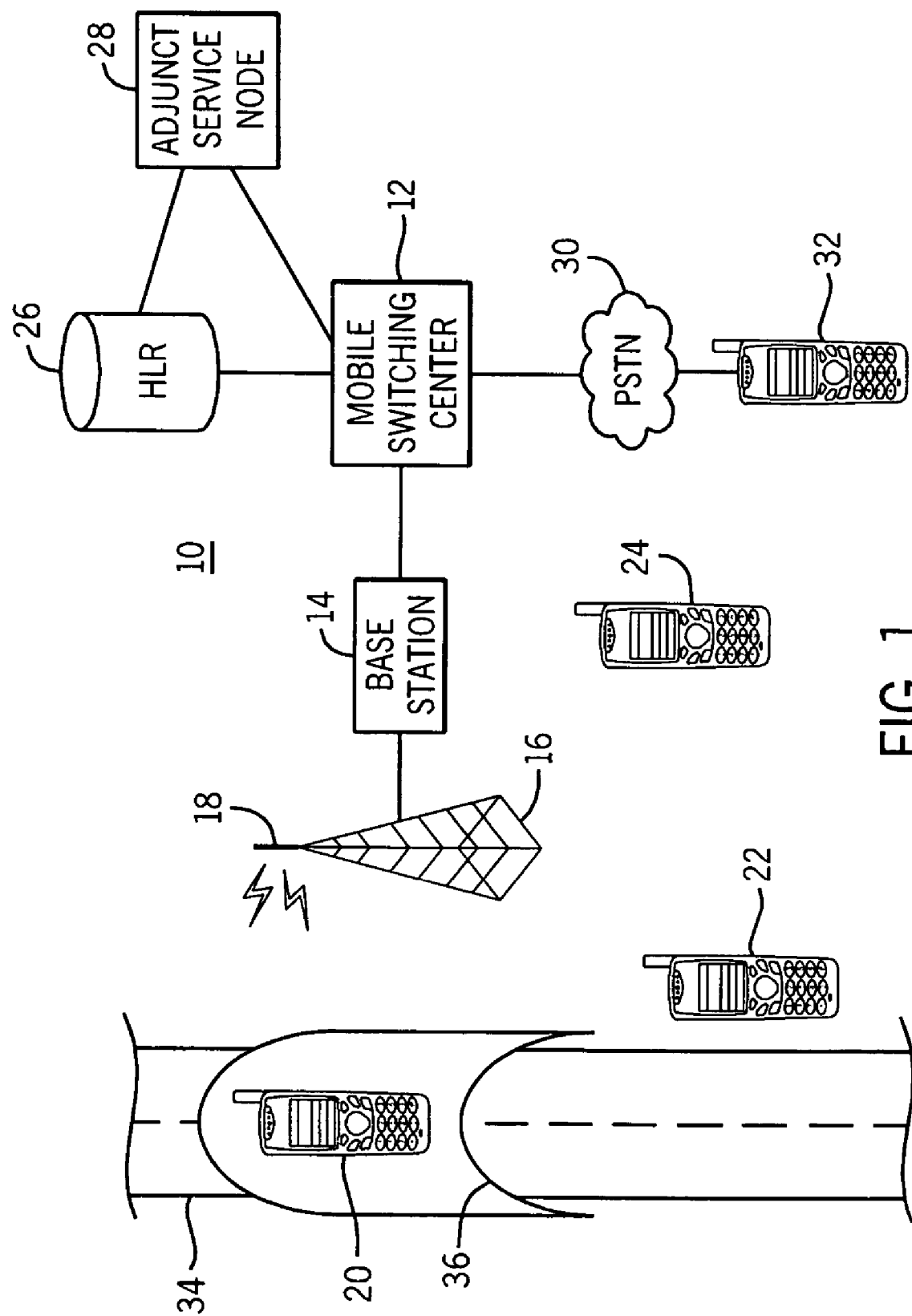
FIG. 1 is a block diagram of an exemplary telecommunication system suited for incorporating an embodiment of the present invention.

FIG. 1 is a block diagram of a telecommunication system 10 suited for incorporation of an embodiment of the present invention. A mobile switching center 12 supports the routing of calls and traffic such as text messaging to and from wireless communication devices. An exemplary RF communication link is supported by base station 14, tower 16 and cellular antenna 18. It will be understood that a typical system will utilize a plurality of such RF communication links that can all be supported by mobile switching center 12 wherein each RF communication link may comprise a cellular service area. Exemplary wireless devices 20, 22 and 24 are within the area of service, i.e. anticipated RF coverage area, normally provided by antenna 18. The wireless devices are also referred to herein as mobile devices or just mobiles.

A home location register (HLR) database 26 stores records corresponding to mobiles for which database 26 is the home register. As is known, HLR database 26 provides initial log-on registration, authentication and billing support. The HLR database 26 is connected to the mobile switching center 12 and an adjunct service node 28 that is capable of providing additional processing and services with respect to the handling and routing of wireless calls and traffic. The public switched telephone network (PSTN) 30 is coupled to the mobile switching center 12 and supports a plurality of wire line telephones of which telephone 32 is one. In this example telephone 32 is an ISDN telephone capable of voice and data (text) communications.

Within the area of coverage provided by cellular antenna 18 is a recreational walking path 34 that passes through a tunnel 36. The tunnel is oriented and constructed such that it creates an RF dead zone for mobiles in the tunnel with regard to RF communications from any cellular antenna.

Thus, as shown the subscriber utilizing mobile 20 is inside tunnel 36 and hence RF communications will not be possible until the subscriber exits the tunnel.

In accordance with an embodiment of the present invention, an alerting feature is made available to telephone subscribers wherein an alert is provided to the party originating a call to a mobile that does not have an RF communication link when an RF communication link with the call mobile becomes available. As an example, assume that a calling party associated with telephone 32 or mobile 24 originates a call to the user of mobile 20 while the called party is within tunnel 36. The call will not complete since an RF communication channel with mobile 20 is not available. If the calling party subscribes to the alerting feature or if the communication provider makes the alerting feature available to all subscribers, the calling party will at least be automatically notified when an RF communication link with mobile 20 becomes available. As will be discussed in more detail with regard to FIG. 2, the notification may consist of a predetermined text message originated by the infrastructure equipment and sent to the calling party such as by a short messaging system (SMS) message. Alternatively, the infrastructure equipment could automatically take other actions such as establishing the call by making a call origination to the called party and calling party and conferencing the calls, assuming both corresponding telephones are active and not busy.

Figure 2:
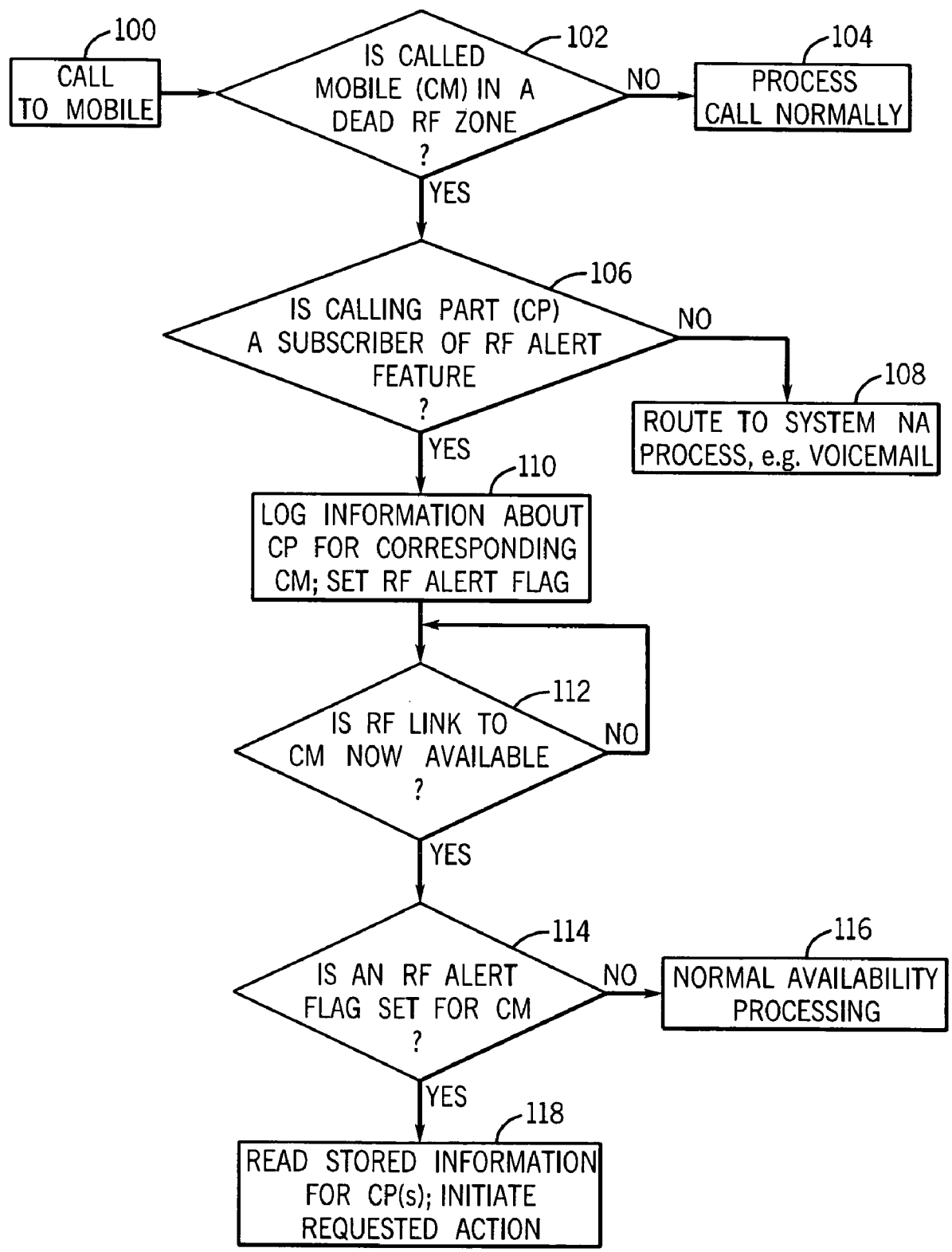
FIG. 2 is a flow diagram of exemplary steps in accordance with an embodiment of the present invention.

FIG. 2 is a flow diagram of steps of an illustrative method in accordance with the present invention. In step 100 a call origination is made to a mobile. For example, the mobile switching center 12 will recognize that an incoming call request is to one of its served mobiles. In step 102 a determination is made of whether the called mobile (CM) is in a dead RF zone. The mobile switching center 12 determines that the called mobile is not currently registered and/or active based on an inquiry to HLR database 26. Since an RF channel is not available to the called mobile, the mobile may be deemed to be in a dead RF zone. Of course, it may be that the user of the called mobile may have merely turned the mobile OFF. A NO determination by step 102 means that an RF channel is available to the called mobile and hence the call request is processed normally as indicated at step 104.

A YES determination by step 102 results in processing by step 106 in which it is determined if the calling party (CP) is a subscriber of the RF alert feature. This determination may be carried out by mobile switching center 12. A NO determination by step 106 results in the call request being routed to the system's Not Available (NA) process such as a voice mailbox corresponding to the called mobile. A YES determination by step 106 causes information about the CP to be logged in a record associated with CM including the setting of an RF alert flag. The record may be stored in the HLR database 26 associated with information stored for the corresponding called mobile. The stored information about the CP includes at least sufficient information to permit a message to be sent to and/or call to be placed to the CP. For example, this could consist of an e-mail address, packet location identification and/or telephone number associated with the calling party.

In step 112 a determination is made of whether an RF link to the called mobile is now available. The mobile switching center 12 in cooperation with the HLR database 26 can make this determination. A NO determination returns processing to the beginning of this step effectively creating a wait state. A YES determination means that an RF channel is now available to the called mobile and causes processing to continue to step 114 in which a determination is made of whether an RF alert flag is set for the called mobile. The mobile switching center 12 can determine if an alert flag associated with the previously called mobile, which has just become registered and active, has been set. A NO determination by step 114 results in the normal availability processing of the now active mobile as indicated in step 116. That is, the previously called mobile can receive and originate calls and traffic. However, the lack of an RF alert flag being set for the corresponding activated mobile will not cause any alerts to be originated even if an unsuccessful prior call attempt had been made. A YES determination by step 114 results in the reading of the previously stored information about the calling party. Additionally, action is initiated automatically involving at least some form of communication to the party that previously called. This action may be accomplished by the mobile switching center 12 in combination with the HLR database 26. The action to be taken can be determined by the telecommunication provider. The action may consist of the generation and transmission of an SMS message to the party that previously called informing the party that the previously called mobile is now available. Alternatively, the mobile switching center could be programmed to originate calls to both the previously called mobile and the calling party, with these calls being conferenced, to effect the automatic generation of a delayed call origination between the parties.

As an alternative to the mobile switching center 12 conducting much of the processing for the subject alerting feature as explained above, the adjunct service node 28 in conjunction with the mobile switching center 12 and HLR database 26 could be utilized as the primary process responsible for effectuating the alert feature. In a further implementation, the origination switch that serves the initial calling party could be utilized to generate the alert or signal to be transmitted to the calling party upon the called mobile becoming available. In the latter implementation SS7 or other intranetwork signaling could be utilized to convey the information to the originating switch from the mobile switching center 12 and HLR database 26.

In another embodiment it is possible to make a determination with improved accuracy that the called mobile is in an RF dead zone as opposed to the called mobile merely being turned OFF. For example, if a time stamp kept in the HLR database 26 relating to a mobile shows that the subject mobile had been recently registered and active, e.g. within the few minutes or other predetermined interval of time, but is now inactive/unavailable, an assumption that the mobile entered a dead RF zone is more likely. That it is, if the subject mobile has not been registered/active for a longer period of time, e.g. 20 minutes or an appropriate time interval, it is more likely that the mobile is either turned OFF or out of the accessible communication region. This information could be utilized in making the decision of the step 102 in order to provide a higher probability that the called mobile is only temporarily unavailable due to being in an RF dead zone. This can be used to inhibit the alerting feature if it is desired to only permit alerts while the mobile is temporarily unavailable. Alternatively, the calling party could be given the option of activating the alert feature for only situations, i.e. as determined by the time the mobile has been unavailable, where the mobile is likely in an RF dead zone.

In a further implementation the calling party may be offered an election as to the type of action to be taken upon the called mobile becoming available. For example, a message transmitted by the mobile switching center 12 (or adjunct service node 28) to the calling party may advise of the possible options such as sending an alert message to the calling party upon the mobile becoming available or automatically initiating a call between the parties upon the mobile becoming available. The calling party may exercise the selected option by sending a return message or by entering a DTMF signal corresponding to a particular option.

A situation may exist in which a party may know that a mobile is currently unavailable. For example, the party desiring to communicate with the mobile may know that the mobile user is a passenger on a commercial flight in which cellular communications are not permitted. Even so, the party desires to communicate with the mobile user as soon as the flight is over and the mobile is activated. Assuming that the party desiring early communications with the mobile is a subscriber to the RF alerting service, the party could send an additional signal, e.g. a suffix #2, following the entry of the normal telephone number of the mobile as an instruction to the infrastructure equipment to set a corresponding alert flag for the mobile. This would be advantageous in that resources are conserved since the cellular infrastructure equipment could merely initiate the alert feature directly without having to first attempt a call origination to a mobile which is known not be to available. In such a situation the mobile switching center 12 would recognize the signaling suffix and directly initiate implementation of the RF alert feature in cooperation with the HLR database 26.

The steps or operations described herein are just exemplary. There may be many variations to these steps or operation without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method implemented by a wireless telecommunication system comprising the steps of:

receiving a call origination request from a party for a call to be placed to a wireless mobile;

determining if the call origination request includes a special signal entered by the party, where the special signal is not part of the telephone number of the wireless mobile;

upon determining that the special signal is present:

storing information about the party where the information is stored in a record associated with the wireless mobile;

setting an alert flag associated with the wireless mobile;

determining that an RF link has become available to the wireless mobile;

detecting the presence of the alert flag for the wireless mobile in response to the determination that the RF link has become available to the wireless mobile;

in response to the detection of the alert flag, automatically taking a communication action by which the party is made aware that an RF link is available to the wireless mobile.

2. The method of claim 1 wherein the communication action comprises sending a text based message to the party where the message is indicative of an RF link is available to the wireless mobile, an address of the party used for sending the message being stored and retrieved from the record.

3. The method of claim 1 wherein the communication action comprises automatically initiating a call between the party and the wireless mobile, a telephone number of the party being stored and retrieved from the record in order to initiate the call.

4. The method of claim 1 further comprising the step of determining whether the party subscribes to an alerting feature, only if the party subscribes will the communication action be taken.

5. The method of claim 1 wherein the step of storing information about the party originating a call to the wireless mobile comprises storing the information in a record in a home location register by which the wireless mobile is authenticated as a valid user in the wireless telecommunication system.

* * * * *